United States Patent [19]

Prichett

[11] 4,188,100
[45] Feb. 12, 1980

[54] ROTARY SLIDE CARRIER SYSTEM

[75] Inventor: Harry W. Prichett, Newtonville, Mass.

[73] Assignee: Media Arts Workshop Inc., Newton, Mass.

[21] Appl. No.: 689,482

[22] Filed: May 24, 1976

[51] Int. Cl.² ............................ G03B 1/42; G03B 21/00
[52] U.S. Cl. ............................................ 353/95; 353/46
[58] Field of Search ...................... 353/12, 46, 95, 96, 353/116, 117

[56] References Cited

U.S. PATENT DOCUMENTS

| | | | |
|---|---|---|---|
| 2,597,449 | 5/1952 | Cassidy et al. | 353/101 |
| 2,960,906 | 11/1960 | Fogel | 353/12 |
| 3,208,336 | 9/1965 | Vago | 353/12 |
| 3,644,031 | 2/1972 | Bennett | 353/104 |
| 3,923,390 | 12/1975 | Susko | 353/95 |

FOREIGN PATENT DOCUMENTS 858568  1/1961  United Kingdom ...................... 353/46

*Primary Examiner*—Steven L. Stephan
*Attorney, Agent, or Firm*—Weingarten, Maxham & Schurgin

[57] ABSTRACT

A device that enables photographic images, black and white or color, to be projected onto a screen by means of a slide projector and have that image rotate, clockwise or counter-clockwise, and at various speeds of rotation, and to be externally controlled to stop and start on a real time manual basis or on an automatic programmed basis. The slide carrier has a motor mounted thereon and interfaces with the projector in the manner of a normal slide carrier as it moves between storage and projector positions. Electrical connection is made through an interconnecting unit to a control box whereby the speed and direction of the slide rotation are controlled.

18 Claims, 6 Drawing Figures

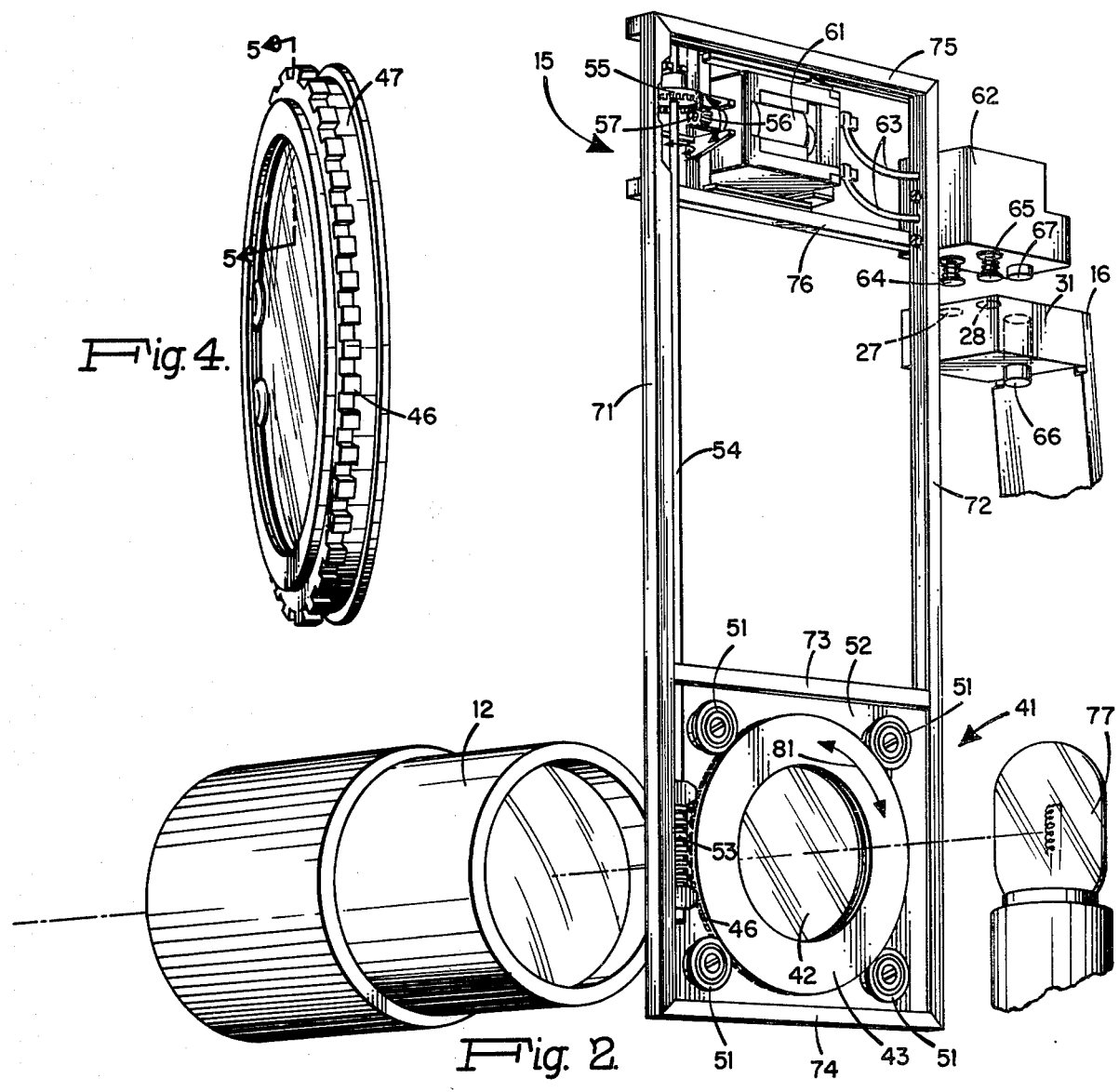
Fig. 4.
Fig. 2.
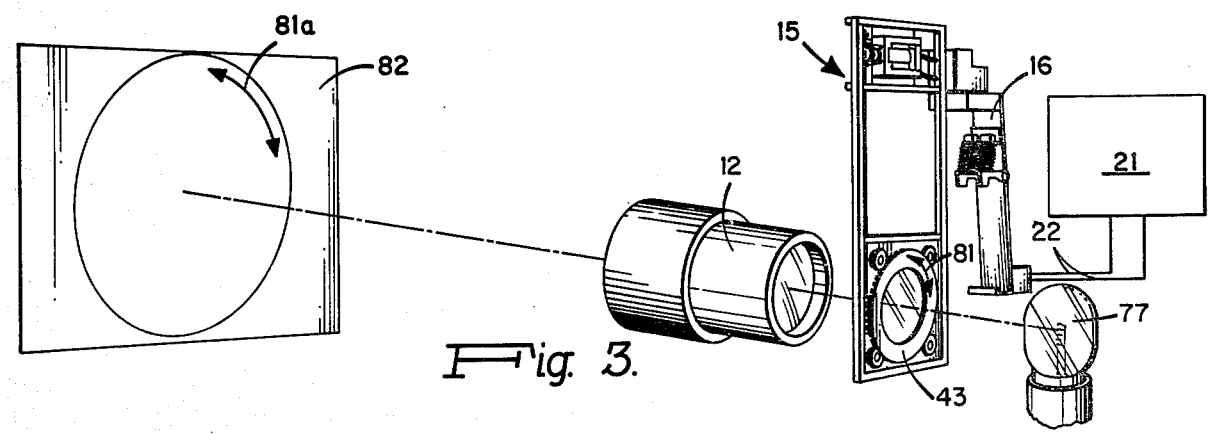
Fig. 3.

ROTARY SLIDE CARRIER SYSTEM

FIELD OF THE INVENTION

This invention relates generally to optically projectable media and more particularly concerns a novel slide carrier for depicting motion when projecting a single slide.

DISCUSSION OF THE PRIOR ART

Slide projectors, and more specifically those of the automated type, have long been available for home and commercial use as well as for educational purposes. Recent techniques have permitted the use of such automatic projectors, one example of which is the automatic slide projector sold under the trademark Carrousel, as a major element in what have come to be known as multimedia shows wherein several such projectors are employed together with fade-in and fade-out means so that an illusion of change or motion using only still slides can be created. When such projectors, with the auxiliary apparatus for slow or rapid change and fade-ins and fade-outs, are coupled with a sound system, a very effective and entertaining show can be put together.

While slide/tape shows are well known, the necessity of coordinating the tape with the slide during both preparation and presentation must always be done very carefully. Slides with built-in sound tracks have been devised to assist in this coordination procedure. Examples of slides which are equipped with magnetic tape tracks are shown in U.S. Pat. Nos. 3,594,076 and 3,671,115.

While illusions of motion have been available through the use of slides with prior art techniques, there has not previously been available any means for providing actual motion to a slide when shown by means of a conventional slide projector.

SUMMARY OF THE INVENTION

Broadly speaking, this invention comprises a known slide projector with a novel slide carrier system associated therewith for operation with the projector in the same manner as a conventional slide carrier. A conventional slide carrier is, of course, the common laminated flat square device in which a slide is mounted. The slide carrier of this invention, however, contains means for providing actual motion or visual changes to the slide as projected on a screen.

When slide rotation is desired, a slide transparency is mounted in a special disc or image frame and is in turn mounted in the carrier of the present invention which has a motor secured thereto to provide rotation of the disc and slide combination. External electrical connection is provided through an interconnecting unit attached to the side of the projector to a control box which is used to control the speed and direction of motion of the slide. The control box has an on/off switch with an indicator light, a direction-of-rotation switch and a speed control. The electrical circuit is substantially a regulated DC power supply,

BRIEF DESCRIPTION OF THE DRAWING

The objects, advantages and features of this invention will be readily appreciated from the following detailed description when taken in conjunction with the accompanyng drawing in which:

FIG. 2 shows in perspective the rotary slide carrier of the present invention in combination with the optics of the projector;

FIG. 3 is a perspective view similar to FIG. 2 but on a reduced scale showing the projection screen in conjunction with the slide carrier and projector optics;

FIG. 4 is a perspective view of the rotatable slide carrying disc of the present invention;

DESCRIPTION OF THE PREFERRED EMBODIMENT

Figure 1:
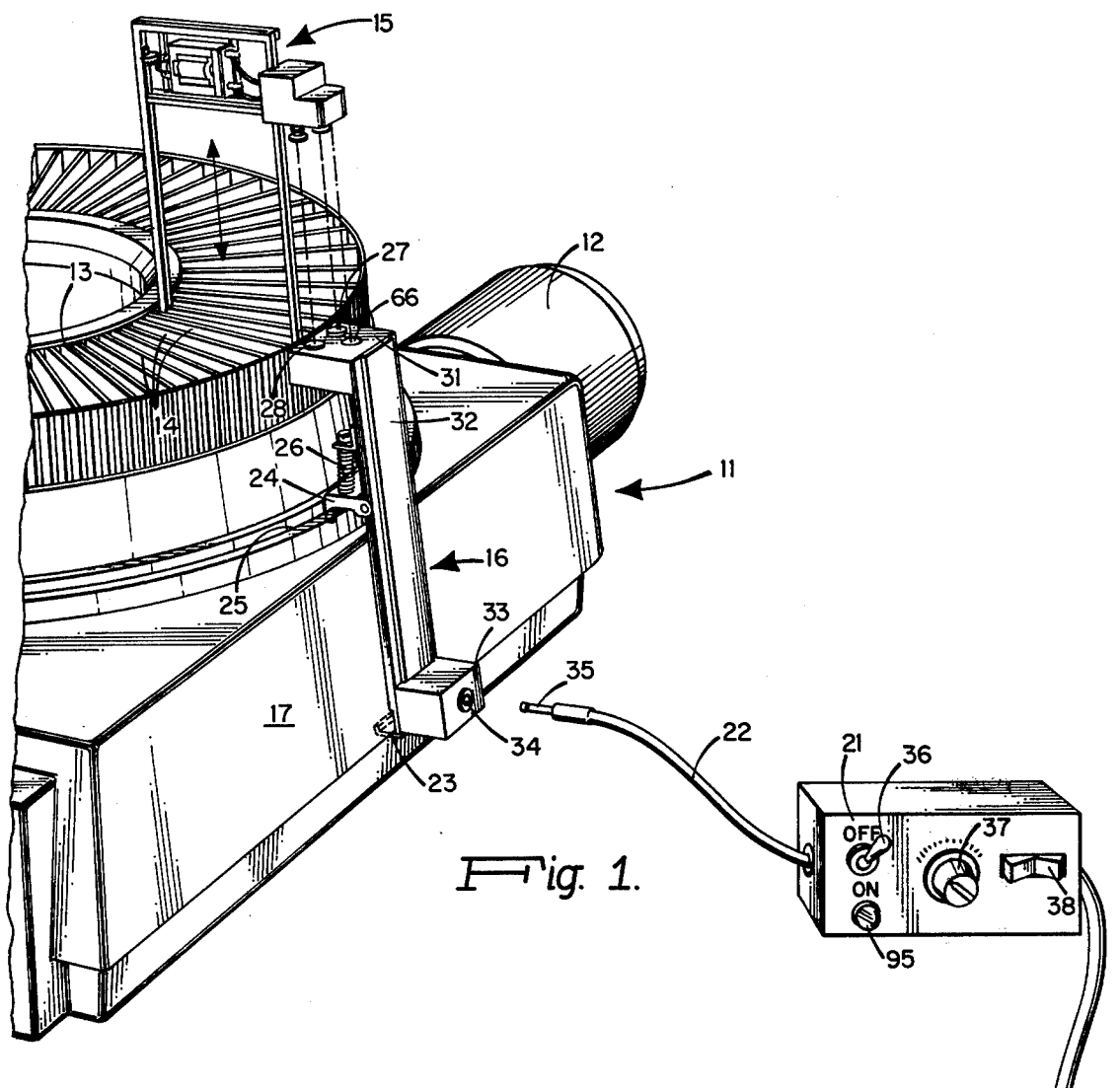
FIG. 1 is a perspective view of a portion of a rotating magazine slide projector showing the system of the present invention coupled thereto.

With reference now to FIG. 1, there is shown slide projector 11 having adjustable lens assembly 12 through which the image of a slide is projected. While an automatic slide projector of the rotating slide tray type is used herein for expository purposes, it is possible to use any type of slide projector, non-automatic as well as automatic. The rotating slide tray or magazine 13 may contain a multiplicity of standard slide transparencies 14 or rotary slide carriers 15 of the present invention. Interconnection unit 16 is mounted to the slide 17 of the projector. Control box 21 is connected to interconnection unit 16 by means of electrical cable 22. Rotary slide carrier 15 makes electrical contact with interconnection unit 16 when in its projection position, that is, when it is in position for projection through the projector optics of the image on the slide contained therein.

Interconnection unit 16 may be mounted to the side 17 of projector 11 by means of a flange 23 engaging the bottom edge of the side of the projector and a latch 24 engaging rim 25 surrounding slide tray 13. Latch 24 may be spring loaded such as by means of a simple spring 26 so that it is easily mounted to and removed from the projector and is positively held in place while mounted thereto. Slide carrier 15 makes electrical contact with interconnection unit 16 through conductive pads 27 and 28 on the top surface of coupling member 31 which projects laterally from unit 16. Wires or other suitable equivalent means which are not shown are connected to pads 27, 28 and run within member 31 down through the vertical body portion 32 of the interconnection unit and into connection block 33 mounted at the bottom thereof. These wires are connected to coaxial receptacle 34 which receive male coaxial member 35 on the end of wire 22 to connect control box 21 to the interconnection unit. Other suitable coupling devices may be employed to connect wire 22 to connection block 33. Control box 21 has on/off switch 36, variable speed control 37 and directional control switch 38, the functions of which will be explained hereinbelow.

Figure 5:
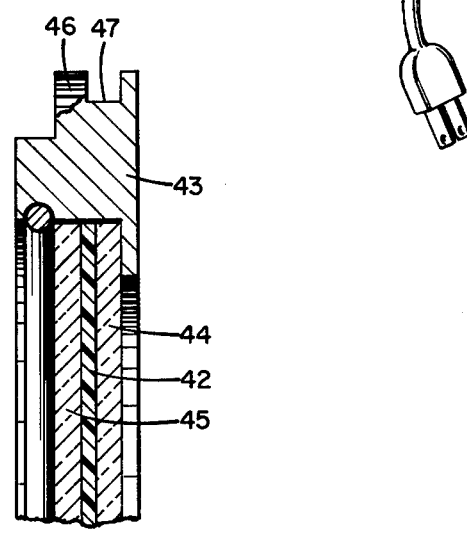
FIG. 5 is a partial sectional view taken along cutting plane 5—5 of FIG. 4.

A preferred embodiment of the rotary slide carrier of this invention is shown in detail in FIG. 2. Bottom portion 41 of carrier 15 is substantially equivalent to the conventional slide carrier or transparency in overall size and thickness. A slide 42 is mounted to rotating disc 43 between two glass plates 44 and 45 (see FIG. 5). Disc 43 may be termed an image frame or slide retaining means and is formed with a circumferential ring spur gear 46 on a portion of the outer periphery thereof. This gear is shown more clearly in FIG. 4. Disc 43 is also provided with a circumferential bearing channel 47 in which a portion of the periphery of each rotatable bearing member 51 resides. Disc 43 is mounted in a circular opening in plate 52 and is securely held in place by bearing members 51 which are mounted to the plate. A worm gear 53 is mounted to the end of shaft 54 and engages with ring spur gear 46 on disc 43. At the opposite end of shaft 54 is another spur gear 55 which is engaged by pinion 56 mounted to shaft 57 of electrical motor 61. Motor 61 is connected to junction box 62 by means of wires 63 and is coupled to conductive pads 27 and 28 of the interconnection unit by suitable means such as spring loaded contacts 64 and 65 respectively. These contacts are preferably gold-plated to ensure good electrical contact. In order to ensure proper and positive connection between carrier 15 and interconnection unit 16, coupling member 31 is fitted with a magnet 66 extending into the top surface thereof. Metallic slug 67 is mounted to the bottom of junction box 62 and spaced from contacts 64 and 65 so as to mate with magnet 66. When the carrier is in the projecting position with respect to the projector, electrical contact is made between the contacts of junction box 62 and the contact pads of coupling member 31 and it is maintained in place by means of the coaction between magnet 66 and metallic slug 67.

The external dimensions of slide carrier 15 are formed of longitudinal frame members 71 and 72, with lateral frame members 73 and 74 at the bottom which serve to confine plate 52 and define bottom portion 41 of the carrier. Lateral members 75 and 76 at the top complete the frame of the slide carrier and provide a means for mounting motor 61 and the top end of shaft 54 within the carrier. Suitable bearings may be located in lateral frame members 73 and 75 to secure and stabilize shaft 54 within the frame. The various elements comprising the slide carrier are secured together in any convenient positive manner and the particular means therefor is not important to the present invention.

The relationship of the slide carrier when in the projection position with respect to the optics of the projector is shown in FIGS. 2 and 3. The carrier is shown in the storage position in FIG. 1. Carrier 15 is positioned between lamp 77 and lens assembly 12 in the manner of a conventional slide carrier 14. As indicated by arrow 81, disc 43 may rotate in either direction and produces equivalent rotational motion on screen 82 as indicated by arrow 81a. Control box 21 is used to control the motion, that is, rotational direction, and the speed of motion of the disc 43 as previously mentioned. Electrical power to the system is controlled by means of on/off switch 36. Directional rocker switch 38 has three positions: the neutral position as shown in FIG. 1 when no power is applied to motor 61 and the slide or image frame remains stationary; when the switch is rocked to the right to produce rotation in one direction; and the reverse position when the switch is rocked to the left to produce rotation in the other or reverse direction. The speed of rotation of disc 43 is controlled by potentiometer 37 in conventional manner.

Figure 6:
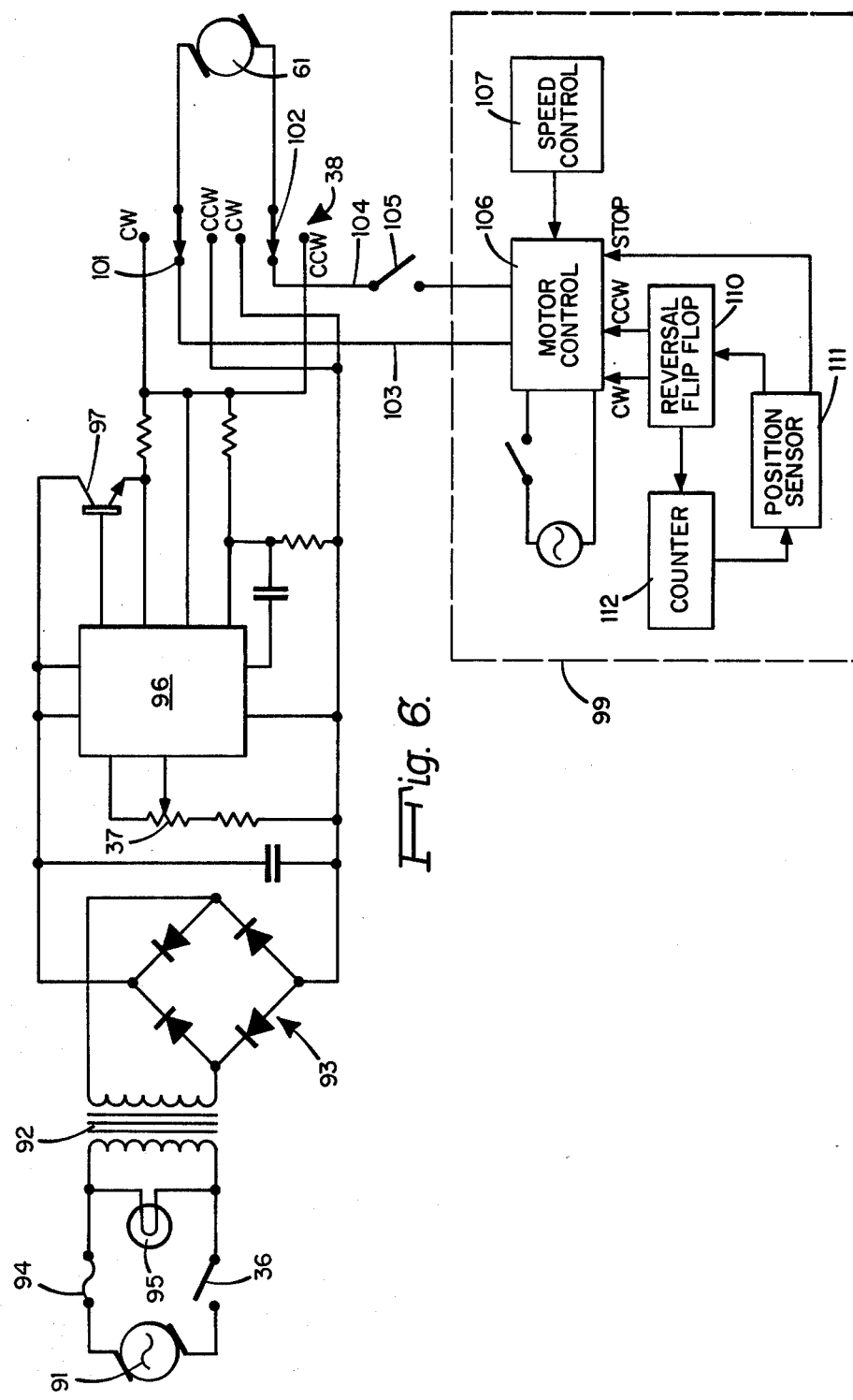
FIG. 6 is an electrical schematic diagram of a circuit which may be used in the control box of FIG. 1.

The circuit within control box 21 is shown in FIG. 6. The basic principle of operation of this circuit is that of a regulated DC power supply. This type of power supply maintains a set voltage regardless of output load, thus maintaining accurate speed control over various load conditions. A standard source of AC power 91 supplies electrical power to the circuit through a power transformer 92 to conventional bridge and filter rectifier 93. A slo-blo fuse 94 is employed between the AC power and the transformer to prevent input short circuit damage. A neon bulb 95 indicates when the circuit is on as controlled by on/off switch 36. The heart of the regulator circuit is an integrated circuit 96 which may be a commercially available National Semiconductor 723 or equivalent. This integrated circuit replaces approximately 40 discrete components that would otherwise be required to form a regulated power supply. Since the output current through the integrated circuit is limited, an external NPN pass transistor 97 permits currents up to one amp to flow. The resistors and capacitor to the right of integrated circuit 96 comprise current limiting sense circuits which are designed to prevent excessive output dissipation in case of a short circuit. The output of the circuit of FIG. 6 feeds into double pole, double throw switch 38 with a center-off position as previously described. This switch is wired to give no output in the center position, normal polarity for forward rotation in the right hand position, and reverse polarity for reverse rotation in the left hand position.

The basic control circuit of FIG. 6 has been described above. However, if desired, the motion of the image frame can be automatically programmed to go through a routine. Programming circuitry 99 may be connected across terminals 101 and 102 of switch 38 by means of wires 103 and 104. A switch 105 permits the programming circuitry to be connected to or disconnected from switch 38 as desired. Programmer 99 is shown with its own connection to an electrical power source. There are, of course, many other ways of connecting the programming circuitry to the motor and FIG. 6 is meant as an example only.

The programming circuitry includes means for controlling the speed and direction of rotation of the image frame, the number of revolutions in either direction and it may stop rotation at any desired angle. Any sequence of the motions may be programmed to suit particular requirements. If desired, several such programming circuits may be provided for any slide show and each rotary slide 15 may be associated with a different programmed sequence. A very simple example of such programmed motion for a slide tape show is that a slide showing a bell may be rotated alternately a few degrees in either direction in coordination with the sound of a bell ringing recorded on the tape. Much more complex sequences are possible with known technology. FIG. 6 shows motor control 106 to which is coupled speed control 107, reversal flip flop 110 and position sensor 111. Counter 112 is coupled between the flip flop and the position sensor. By using this programming circuitry, one may easily go through the bell ringing sequence mentioned above, and have the image frame stop at any desired angle.

As described herein, motor 61 is contemplated to be a variable speed, reversible electric motor. Although on/off switch 36 controls the power applied to the circuit of FIG. 6, switch 38 controls the power and the polarity of the power applied to motor 61. Potentiometer 37 controls the speed of rotation of the motor. Thus control box 21, containing the FIG. 6 circuit, controls the motion of the image frame (whether on or off and whether rotating clockwise or counterclockwise) as well as the speed of that motion.

While a worm gear, spur gears and a pinion gear are shown for coupling motor rotation to image frame 43, rotation could be effected in other ways. As one example there could be direct drive from the motor shaft to the image frame. The motor could be oriented downwardly and the worm gear could be mounted to an extension of the motor shaft. The motor shaft need not be normal to any of the slide carrier frame members but could extend from the top to the bottom of the carrier at an angle thereacross.

In view of the above description, it is likely that modifications and improvements will occur to those skilled in the art which are within the scope of this invention.

What is claimed is:

1. A slide carrier system for use with a conventional projector of flat transparent slides, said projector being formed with a slot adapted to retain one of said transparent slides in a position common with the axis of the projector light bulb and lens assembly, said position being the slide projection position, said flat transparent slides being readily interchangeably placed in said slot, said slide carrier system comprising:
   means for retaining a transparent slide;
   a carrier frame, said means for retaining said transparent slide being mounted on said carrier frame for rotation with respect thereto, said carrier frame being adapted to be selectively placed into said slot in said projector so that said transparent slide is in said slide projection position, said carrier frame and said transparent slides being interchangeable with each other to reside in said slot in said projector;
   a motor mounted on said carrier frame;
   means coupling said motor to said transparent slide retaining means for rotation thereof; and
   means for coupling a source of power to said motor for selective rotation thereof.

2. The slide carrier system recited in claim 1 wherein said means for coupling said motor to said slide retaining means comprises:
   a ring spur gear on said slide retaining means;
   a shaft coupled to the shaft of said motor and extending from said motor to a point adjacent said ring spur gear; and
   a worm gear on said shaft engaging said ring spur gear;
   whereby rotation of said motor causes rotation of said slide retaining means.

3. The slide carrier system recited in claim 1 and further comprising:
   means for controlling the rotation of said slide retaining means; and
   means for connecting said motor to said controlling means; said controlling means comprises an electrical circuit comprising:
   means adapted for connection to a supply of electrical power;
   a first switch for connecting and disconnecting electrical power to said circuit;
   rectifier means; and
   a three-position second switch having a first position for coupling electrical signals of one polarity to said connecting means, a second position for coupling electrical signals of the opposite polarity to said connecting means, and a third position for uncoupling said circuit from said connecting means.

4. The slide carrier system recited in claim 3 wherein said motor is an electrical, reversible, variable speed motor, whereby when said switch is in a first position said motor rotates in one direction, when said switch is in a second position said motor rotates in the opposite direction, and when said second switch is in a third position, said motor does not rotate.

5. The slide carrier system recited in claim 3 wherein said circuit further comprises a variable resistor and a control for moving the tap of said variable resistor, whereby when said tap is adjacent one end of said resistor and said three-position switch is in one of said first and second coupling positions, said motor rotates slowly, and when said tap is adjacent the other end of said resistor and said three-position switch is in one of said first and second coupling positions, said motor rotates rapidly, the speed of rotation of said motor being continuously variable between slow and fast depending upon the position of said tap with respect to said variable resistor.

6. The slide carrier system recited in claim 3 wherein said motor is an electrical, reversible, variable speed motor, said system further comprising means coupled to said motor for programming the direction of rotation, angle of rotation and speed of rotation of said slide retaining means in a predetermined sequence.

7. The slide carrier system recited in claim 1 wherein said carrier frame is elongated, said motor is mounted adjacent one end and said slide retaining means is mounted adjacent the other end, said one end extending out of said projector when said other end is in projection position between said projection bulb and said lens assembly for projection of the image contained in said transparent slide on a surface external to said projector.

8. The slide carrier system recited in claim 7 wherein:
   said slide retaining means is formed with a central opening, a circumferential bearing groove and a circumferential ring spur gear adjacent said bearing groove;
   said carrier frame further comprises:
   a plate mounted to said other end of said carrier frame and having an opening therein within which said slide retaining means is mounted; and
   a plurality of rotatable bearing guides mounted to said plate, a portion of each of said bearing guides mounted to said plate, a portion of each of said bearing guides extending into said circumferential bearing groove, thereby retaining said slide retaining means rotatably movable in said opening in said plate.

9. A slide carrier system for use with a projector for a plurality of flat transparent slides, said projector having a projection bulb, a lens assembly, a slide projection position and a slide storage position, said slide storage position being integral with a multiple slot storage magazine formed with a plurality of adjacent positions, each position being formed to retain a flat transparent slide, said magazine being mounted on said projector so that said transparent slides are readily transferred between said projection position and said storage position, said projector being adapted to project images individually from said plurality of transparent slides, only one of which can be in said projection position at any one time while others of said plurality remain in said storage magazine, said slide carrier system comprising:
   means for retaining a transparent slide;
   a carrier frame shaped and configured to normally reside in said storage position in said slide projector and being retained in one of said slots in said storage magazine interchangeably with one of said transparent slides, said means for retaining said transparent slide being mounted on said carrier frame for rotation with respect thereto, said carrier frame being adapted to selectively transfer said transparent slide retained therein to said slide projection position interchangeably with said transparent slides; and means on said carrier frame for rotating said slide retaining means with respect to said carrier frame.

10. The slide carrier system recited in claim 9 wherein said means for rotating said slide retaining means comprises a motor mounted on said carrier frame and means for connecting a source of power to said motor.

11. The slide carrier system recited in claim 10 and further comprising:

means for controlling the rotation of said slide retaining means, said connecting means also coupling said motor to said controlling means, wherein said motor is an electrical motor connected to a source of electrical power.

12. The slide carrier system recited in claim 11 wherein said connecting means comprises:

a bar removably mounted to said projector;
a connecting element on one end of said bar;
electrically conductive wires connected between said controlling means and said connecting element;
a coupling member on the other end of said bar;
first and second contact pads on said coupling member; and
means for electrically interconnecting said contact pads to said connecting element.

13. The slide carrier system recited in claim 12 wherein said connecting means further comprises:

a junction box mounted to said carrier frame;
first and second contact members extending from said junction box;
electrically conductive wires connecting said motor to said junction box; and
means within said junction box for interconnecting said electrical wires to said first and second contact members;
whereby said contact members are adapted to engage said contact pads on said coupling member to electrically interconnect said motor and said connecting element.

14. The slide carrier system recited in claim 13 wherein said connecting means further comprises:

a magnet mounted to one of said coupling member and said junction box; and
a metallic slug mounted to the other of said coupling member and said junction box, said magnet and said metallic slug cooperating to maintain said contact pads and said contact members in contacting relationship when said transparent slide in said carrier frame is in projection position.

15. The slide carrier system recited in claim 10 wherein said carrier frame is elongated, said motor is mounted on said carrier frame adjacent one end thereof, said slide retaining means is mounted on said carrier frame adjacent the other end thereof, said one end projects outwardly from said storage magazine when said carrier frame is in said storage position and projects outwardly from said projector when said slide retaining means is in said projection position.

16. The slide carrier system recited in claim 15 wherein:

said slide retaining means is formed with a central opening, a circumferential bearing groove and a circumferential ring spur gear adjacent said bearing groove;

said carrier frame further comprises:

a plate mounted to said other end of said carrier frame and having an opening therein within which said slide retaining means is mounted; and
a plurality of rotatable bearing guides mounted to said plate, a portion of each of said bearing guides extending into said circumferential bearing groove, thereby retaining said slide retaining means rotatably movable in said opening in said plate.

17. The slide carrier system recited in claim 10 wherein said motor is an electrical, reversible, variable speed motor, said system further comprising means coupled to said motor for programming the direction of rotation, angle of rotation and speed of rotation of said slide retaining means in a predetermined sequence.

18. The slide carrier system recited in claim 10 wherein said means for rotating said slide retaining means further comprises means for coupling said motor to said slide retaining means, said coupling means comprising:

a ring spur gear on said slide retaining means;
a shaft coupled to the shaft of said motor and extending from said motor to a point adjacent said ring spur gear; and
a worm gear on said shaft engaging said ring spur gear;
whereby rotation of said motor causes rotation of said slide retaining means.

* * * * *

UNITED STATES PATENT AND TRADEMARK OFFICE
CERTIFICATE OF CORRECTION

PATENT NO.   :   4,188,100
DATED        :   February 12, 1980
INVENTOR(S)  :   Harry W. Prichett It is certified that error appears in the above–identified patent and that said Letters Patent are hereby corrected as shown below:

Column 6, lines 42-43, "guides mounted to said plate, a portion of each of said bearing guides extending into said circum-" should read -- guides extending into said circum- --.

Signed and Sealed this

Twenty-fourth Day of June 1980

[SEAL]

Attest:

SIDNEY A. DIAMOND

Attesting Officer

Commissioner of Patents and Trademarks